United States Patent
Terada et al.

(10) Patent No.: US 9,397,601 B2
(45) Date of Patent: Jul. 19, 2016

(54) POWER GENERATION CONTROL UNIT DETERMINING MAXIMUM EXCITATION CURRENT OF POWER GENERATOR MOUNTED ON VEHICLE

(71) Applicant: DENSO CORPORATION, Kariya, Aichi-pref. (JP)

(72) Inventors: Kengo Terada, Kariya (JP); Kenji Sugiura, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/164,323

(22) Filed: Jan. 27, 2014

(65) Prior Publication Data
US 2014/0210426 A1  Jul. 31, 2014

(30) Foreign Application Priority Data
Jan. 25, 2013  (JP) .................................. 2013-011583

(51) Int. Cl.
  *H02P 11/00* (2006.01)
  *H02P 9/08* (2006.01)
  *H02P 9/14* (2006.01)
  *H02P 9/48* (2006.01)

(52) U.S. Cl.
  CPC .. *H02P 9/08* (2013.01); *H02P 9/14* (2013.01); *H02P 9/48* (2013.01)

(58) Field of Classification Search
  USPC .......................... 322/24, 28, 59, 44; 307/10.1
  See application file for complete search history.

(56) References Cited

U.S. PATENT DOCUMENTS

| | | | |
|---|---|---|---|
| 4,739,243 A | 4/1988 | Iwatani et al. | |
| 5,739,677 A * | 4/1998 | Tsutsui et al. | 322/25 |
| 2008/0133064 A1* | 6/2008 | Basic et al. | 700/287 |
| 2010/0225284 A1* | 9/2010 | Aoyama | 322/19 |
| 2012/0091973 A1* | 4/2012 | Horihata | 322/29 |
| 2012/0112709 A1* | 5/2012 | Akita et al. | 322/34 |

FOREIGN PATENT DOCUMENTS

JP  B2-6-38720  5/1994

\* cited by examiner

*Primary Examiner* — Julio Gonzalez Ramirez
(74) *Attorney, Agent, or Firm* — Oliff PLC

(57) ABSTRACT

An on-vehicle power generation control unit includes current detecting unit; communication unit; holding unit; maximum current determining unit; and current control unit. The current detecting unit detects the excitation current at the field winding. The communication unit communicates with an external equipment to receive a first upper limit. The holding unit holds a second upper limit. The maximum current determining unit determines a maximum current to be the second upper limit when the first upper limit has not received by the communication unit or when the received first upper limit is more than or equal to the second upper limit. Further, the maximum current determining unit determines the maximum current value to be the first upper limit when the received first upper limit is less than the second upper limit. The current control unit controls the detected excitation current to be within the maximum current value.

5 Claims, 6 Drawing Sheets

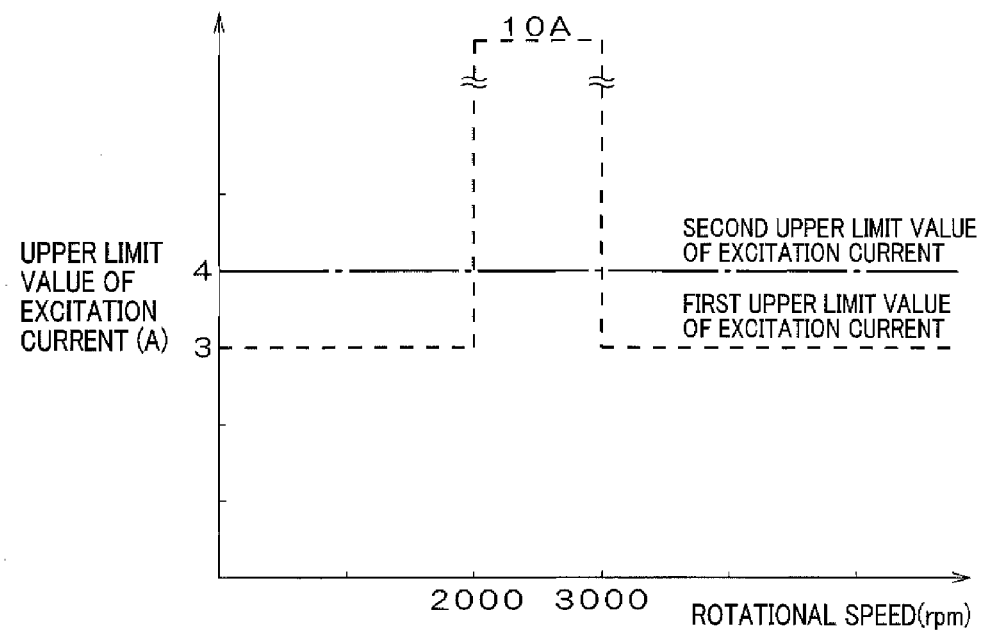
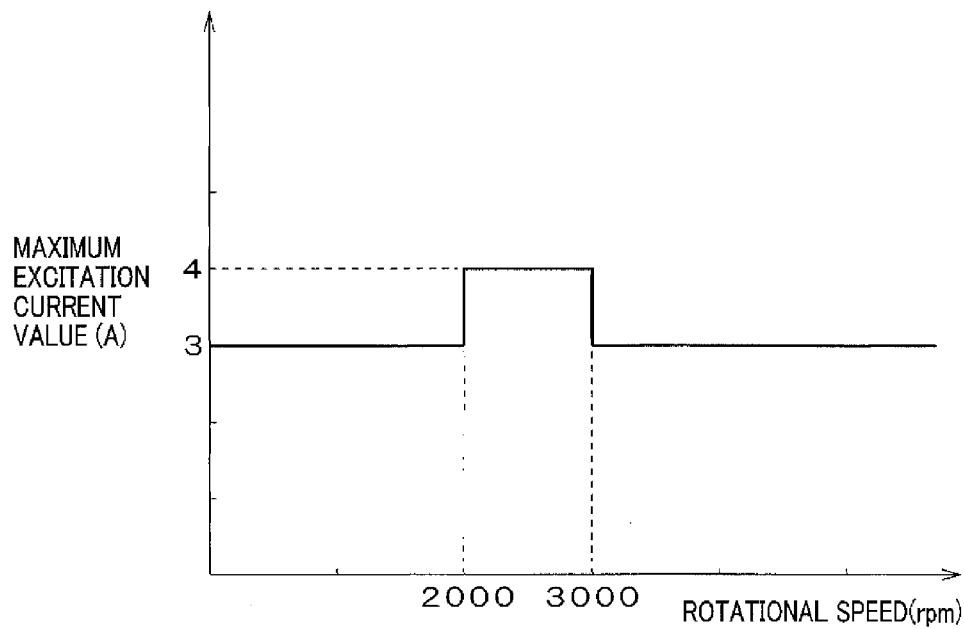

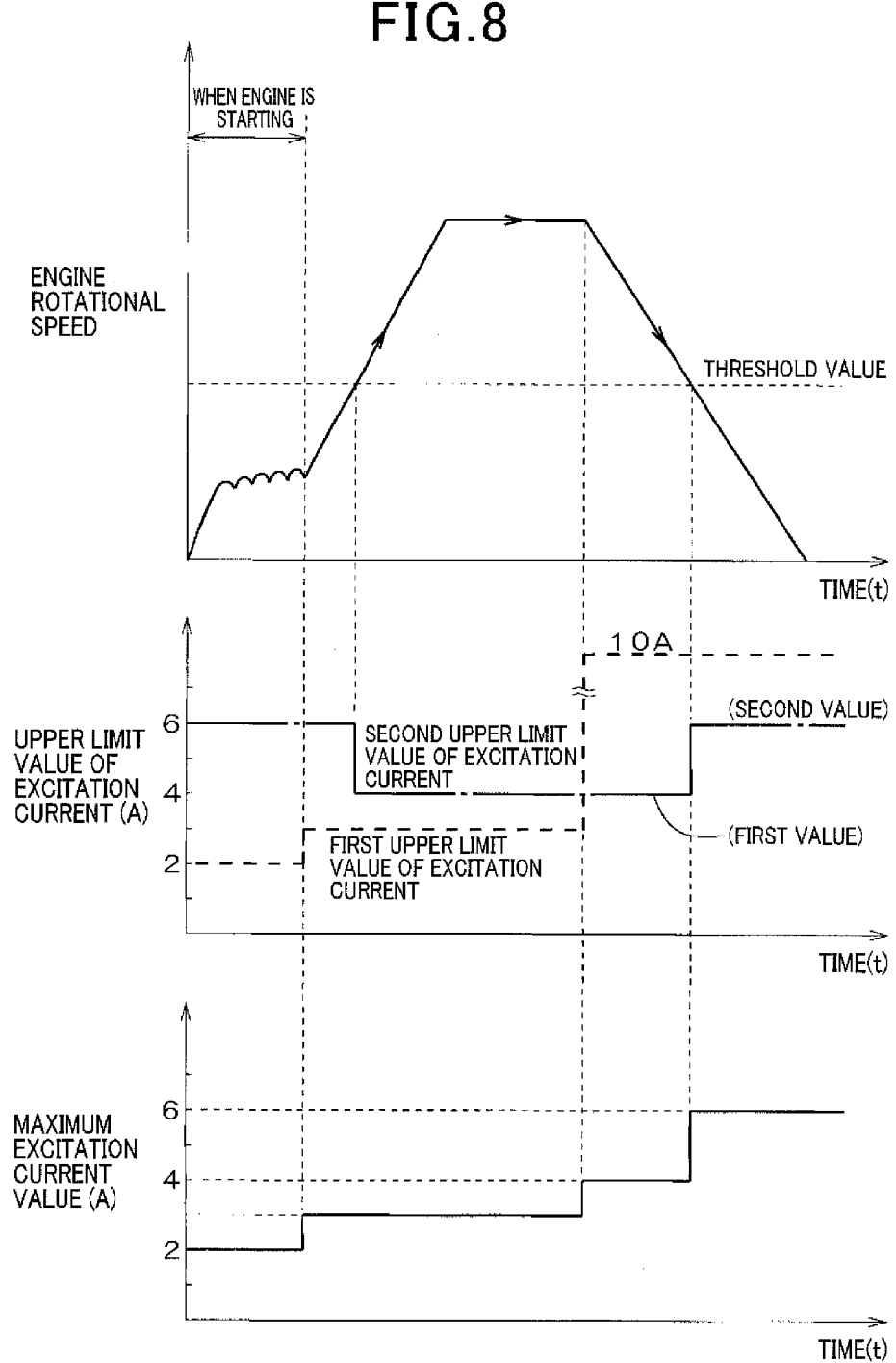

POWER GENERATION CONTROL UNIT DETERMINING MAXIMUM EXCITATION CURRENT OF POWER GENERATOR MOUNTED ON VEHICLE

CROSS-REFERENCE TO RELATED APPLICATION

This application is based on and claims the benefit of priority from earlier Japanese Patent Application No. 2013-11583 filed Jan. 25, 2013, the description of which is incorporated herein by reference.

BACKGROUND

1. Technical Field

The present disclosure relates to an on-vehicle power generation control unit and, more particularly to a power generation control unit that controls power generator mounted on vehicles such as cars and trucks.

2. Description of the Related Art

Generally, maximum output current of the on-vehicle power generator increases when the rotational speed of the power generator becomes higher. Hence, when a large size body is employed for the on-vehicle power generator in order to secure sufficient output power at low rotational speed region, the maximum output current increases at high rotational speed region as well. As a result, since it is necessary to use a charge line having thick cable dimension and a fuse having large current capacity, manufacturing cost and weight of the on-vehicle power generator increases.

As a conventional technique to deal with above-described situation, for example, Japanese Examined Patent Application Publication No. 1994-38720 discloses an on-vehicle power generator in which the excitation current is controlled to be below a predetermined value so that the output current is suppressed. In this type of on-vehicle power generator, a limit value of the excitation current is set so as to obtain predetermined output characteristics when the temperature of the on-vehicle power generator increases to be more than the predetermined value.

Moreover, in recent years, an on-vehicle power generator in which the upper limit value of the excitation current can be set by communicating with the vehicle ECU (electronic control unit) has been developed. In this case, the vehicle ECU transmits a command to control the on-vehicle power generator such that the output power or the output torque of the on-vehicle power generator can be controlled in response to a state of load of the engine or etc, by the command transmitted by the vehicle ECU.

In the on-vehicle power generator disclosed in the above-described patent document, since the on-vehicle power generator suppresses the output current by itself, a problem arises that the on-vehicle power generator cannot perform temporary limiting of the output power (e.g. power generation suppression when the engine starts) based on a request by an external equipment such as a vehicle ECU Meanwhile, in a case where the on-vehicle power generator communicates with the vehicle ECU so as to variably set the upper limit value of the excitation current, thereby controlling the output power of the on-vehicle power generator, the output power can be temporarily limited by setting the upper limit of the excitation current corresponding to the target maximum output current based on the command transmitted by the vehicle ECU.

However, setting the upper limit of the excitation current is determined by cable dimension of the charge line or allowable current capacity of the fuse so that the upper limit of the excitation current needs to be changed depending on the electrical load which varies depending on grade of the vehicle even in the same type of vehicle or, depending on size (characteristics) of the power generator. Therefore, a problem arises that a plurality of vehicle ECUs corresponding to the respective vehicles should be prepared in the power generation control unit.

SUMMARY

An embodiment provides an on-vehicle power generation control unit capable of temporarily restricting the output power in response to a running state of the vehicle and capable of restricting the output power without preparing a plurality of external equipment having different specs based on grade of respective vehicles.

The on-vehicle power generation control unit according to the present disclosure includes current detecting means; communication means; holding means; maximum current determining means; and current control means. The current detecting means is configured to detect the excitation current that flows through the field winding. The communication means is configured to communicate with external equipment so as to receive a first upper limit. The holding means is configured to hold a second upper limit inside the power generator. The maximum current determining means is configured to determine a maximum current value to be the second upper limit when the first upper limit has not been received by the communication means or when the first upper limit received by the communication means is more than or equal to the second upper limit. Further, the maximum current determining means is configured to determine the maximum current value to be the first upper limit when the first upper limit received by the communication means is less than the second upper limit. The current control means is configured to control the excitation current detected by the current detecting means to be within the maximum excitation current value.

Since the excitation current is controlled not to exceed the second upper limit held inside the power generator, it is not necessary to change the upper limit value of the excitation current using external equipment to fit with an electrical load which differs depending on each grade of the vehicle or size of the power generator. Hence, it is not necessary to prepare a plurality of different types of external equipment having different specs depending on every vehicle. Further, when the excitation current is within the second upper value held in the power generator, the excitation current can be variably controlled in response to a command transmitted from an external equipment so that the output power of the power generator can be temporarily restricted based on a running state of the vehicle. Moreover, even when on-vehicle power generation control unit is unable to communicate with the external equipment due to an occurrence of fault, the excitation current can be controlled not to exceed the second upper limit so that the excitation current can be controlled based on thickness of cable dimension of the charge line or current capacity of the fuse.

BRIEF DESCRIPTION OF THE DRAWINGS

In the accompanying drawings:

FIG. 2 is a graph showing a relationship between the upper limit value of the excitation current and the rotational speed of the on-vehicle power generator, corresponding to a case 1;

FIG. 3 is a graph showing a relationship between the maximum excitation current value and the rotational speed of the on-vehicle power generator, corresponding to the case 1;

FIG. 8 is a graph showing variations in time including an engine rotational speed, the upper limit value of the excitation current, and the maximum excitation current value, corresponding to the case 4.

DETAILED DESCRIPTION OF THE PREFERRED EMBODIMENTS

Figure 1:
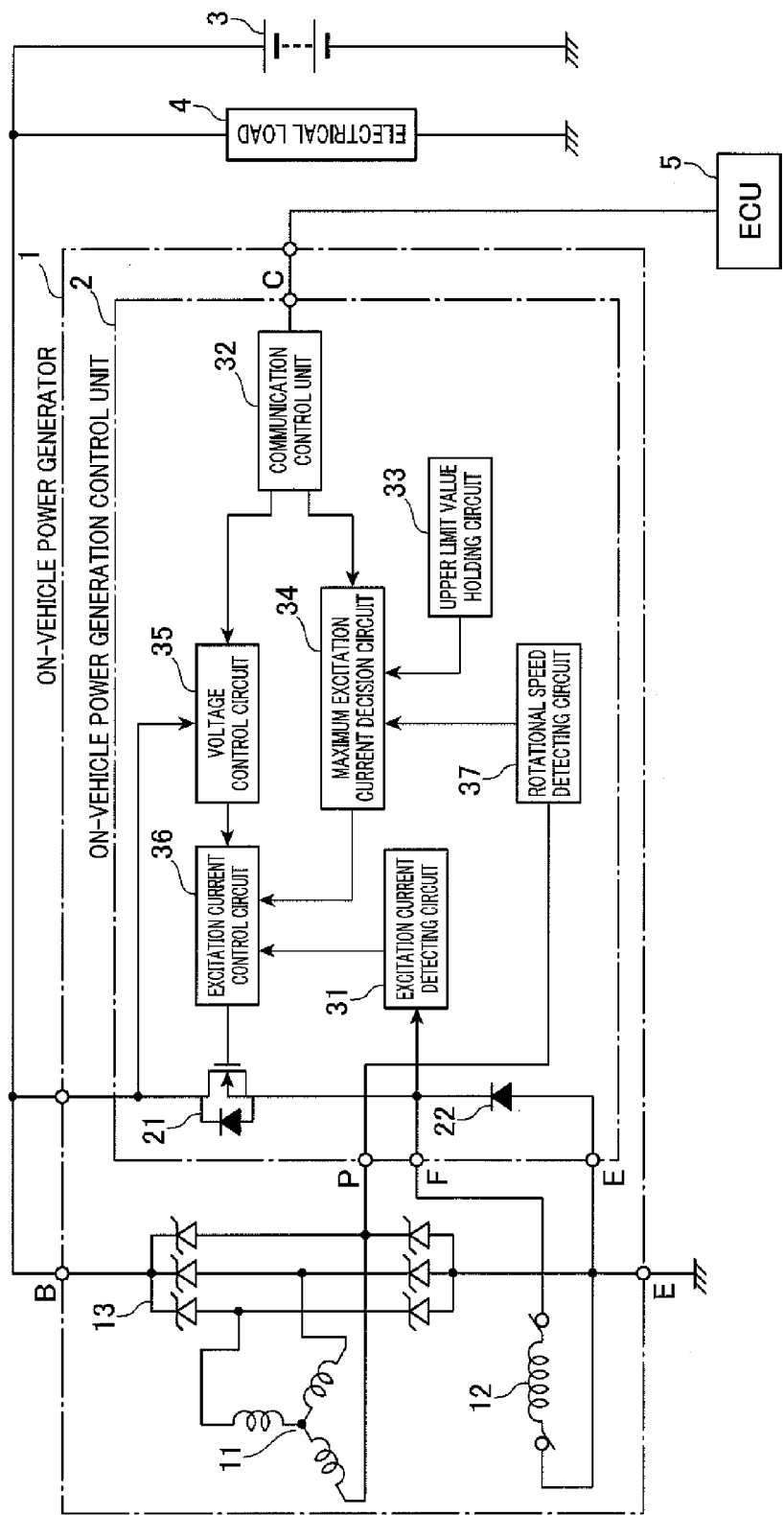
FIG. 1 is a block diagram showing an overall configuration of the on-vehicle power generator according to the embodiment of the present disclosure.

With reference to the drawings, hereinafter is described an embodiment of an on-vehicle power generator in which the configuration of the present disclosure is applied thereto. As shown in FIG. 1, the on-vehicle power generator 1 includes an on-vehicle power generation control unit 2, an armature winding 1, a field winding 12 and a rectifier 13. The on-vehicle power generator 1 is driven by the engine via a belt and a pulley.

The field winding 12 generates magnetic field when conducting electricity. The field winding 12 is wound around the field poles (not shown) so as to constitutes the rotor. The armature winding 11 is constituted by a multi-phase winding, e.g. three phase windings and wound around the armature core so as to constitute the stator. The armature winding 11 generates electromotive force by the rotating field generated by the field winding 12. The AC (alternating current) output which is induced by the armature winding 11 is supplied to the rectifier 13. The rectifier 13 is a full-wave rectifier bridge circuit including, e.g., 6 Zener diodes, and performs full-wave rectification of the AC output of the armature winding 11. The output of the rectifier 13 is outputted externally via the output terminal (B terminal) of the on-vehicle power generator 1 so as to supply the output of the rectifier 13 to the battery 3 and the electrical load 4. The output of the on-vehicle power generator 1 varies in response to the rotational speed of the rotor and a conduction period of the excitation current that flows through the field winding 12. It is noted that the excitation current is controlled by the on-vehicle power generation control unit 2.

Next, the detailed configuration of the on-vehicle power generation unit 2 is described as follows. The on-vehicle power generation unit 2 includes a switching element 21, a freewheel diode 22, an excitation current detecting circuit 31, a communication control circuit 32, an upper limit value holding circuit 33, a maximum excitation current decision circuit 34, a voltage control circuit 35, an excitation current control circuit 36 and a rotational speed detecting circuit 37. The gate of the switching element 21 is connected to the excitation current control circuit 36, the drain is connected to the B terminal of the on-vehicle power generator 1 and the source is connected to the E terminal (earth terminal) via the freewheel diode 22. The source of the switching element 21 is connected to the field winding 12 via the F terminal. Turning ON the switching element 21, the excitation current flows through the field winding 21 and the conduction is stopped when the switching element turns OFF. The freewheel diode 22 is connected in parallel to the field winding 12 to return the current flowing through the field winding 12 when the switching element turns OFF.

The excitation current detecting circuit 31 detects amount of the excitation current that flows through the field winding 12. For example, a configuration disposed in parallel to the switching element 21 so as to detect shunt current of the excitation current, thereby estimating the amount of excitation current. Alternatively, a resistor used for detecting the excitation current can be connected in series to the switching element 21 (not shown) so as to detect the amount of the excitation current based on the voltage difference between both ends terminals of the resistor.

The communication control circuit 32 transmits/receives various signals from/to an ECU 5 (electronic control unit) as external equipment which is connected to the communication control unit 32 via the C terminal (communication terminal) and the signal line. It is preferable to transmit/receive signals by using digital communication so as to avoid influence of noise. The ECU 5 transmits information necessary for power generation, e.g., regulation voltage value and first upper limit value of the excitation current (hereinafter referred to first upper limit), and the information is received by the communication control circuit 32.

The upper limit value holding circuit 33 holds the second upper limit value of the excitation current (hereinafter referred to second upper limit) inside the on-vehicle power generator 1 (on-vehicle power generation control unit 2).

The maximum excitation current decision circuit 34 determines the second upper limit to be the maximum excitation current value when the communication control circuit 32 has not received the first upper limit or the first upper limit received by the communication control circuit 32 is more than or equal to the second limit value held in the upper limit value holding circuit 33. The maximum excitation current decision circuit 34 determines the first limit value to be the maximum excitation current value when the first upper limit received by the communication control circuit 32 is less than the second limit value held in the upper limit value holding circuit 33.

The voltage control circuit 35 compares the output voltage (voltage at the B terminal) of the on-vehicle power generator 1 with a predetermined regulation voltage value, and outputs a signal (active high signal) that commands supplying excitation current to the field winding 12 when the voltage at the B terminal is lower than the predetermined regulation voltage value.

The excitation current control circuit 36 turns the switching element 21 ON and OFF in response to the output signal of the voltage control circuit 35. Specifically, the excitation current control circuit 36 drives the switching element 21 to have a 100% ON-duty ratio (alternatively, an ON-duty ratio slightly lower than 100%, e.g. 95% can be employed), when the output signal of the voltage control circuit 35 is at high level. Moreover, the excitation current control circuit 36 drives the switching element 21 to have a 0% ON-duty ratio (alternatively, an ON-duty ratio slightly higher than 0%, e.g., 5% can be employed), when the output signal of the voltage control circuit 35 is at low level. According to the embodiment, the excitation current control circuit 36 monitors a value of the excitation current detected by the excitation current detecting circuit 31 and sets the duty ratio of the switching element 21 to be less than or equal to the maximum excitation current value which is determined by the maximum excitation current decision circuit 34. Therefore, even when the output signal of the voltage control circuit 35 is at high level, the switching element 21 is turned ON with an ON-duty smaller than 100% when the detected excitation current value exceeds the maximum excitation current value, whereby a value of the excitation current is controlled to be equal to the value of the maximum excitation current.

The rotational speed detecting circuit 37 detects the rotational speed of engine or the on-vehicle power generator 1. The rotational speed detecting circuit 37 detects the rotational speed (power generator rotational speed) of the on-vehicle power generator 1 based on at least either amplitude or frequency of any phase voltage of the armature winding 11 which is transmitted via the P terminal, or detects the engine rotational speed which corresponds to the rotational speed of the power generator.

The above-described excitation current detecting circuit 31 corresponds to the current detecting means. The communication control circuit 32 corresponds to the communication means. The upper limit value holding circuit 33 corresponds to the holding means. The maximum excitation current decision circuit 34 corresponds to the maximum current determining means. The excitation current control circuit 36 corresponds to the current control means. The rotational speed detecting circuit 37 corresponds to the rotational speed detecting means. The on-vehicle power generation control unit corresponds to the control unit.

The on-vehicle power generator 1 according to the embodiment has the above-described configuration. Next, it is described that operation of the on-vehicle power generation control unit 2 in which the maximum excitation current value is set depending on the various cases.

(Case 1)

In the case 1, the following conditions are assumed. The upper limit value holding circuit 33 disposed in the on-vehicle power generator 1 holds the second upper limit which is 4 amperes (FIG. 2). The ECU 5 transmits a command indicating 10 amperes (representing no limitation) as the first upper limit at a rotational speed region (e.g. 2000 to 3000 rpm) at which the power is generated with the highest efficiency, and transmits a command indicating 3 amperes as the first upper limit at the other rotational speed region.

Figure 4:
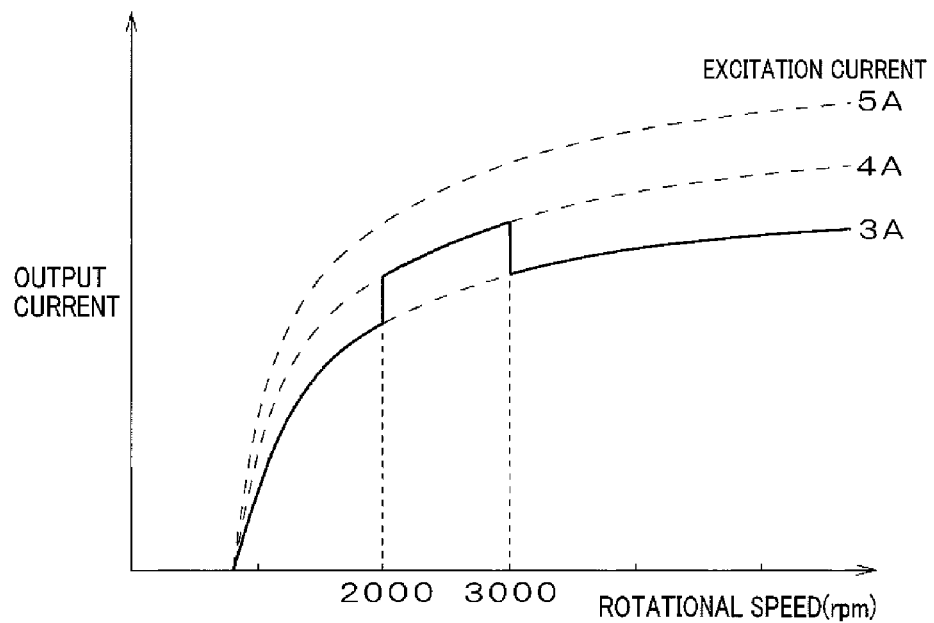
FIG. 4 is a graph showing output characteristics of the on-vehicle power generator when an amount of the electrical load is large, corresponding to the case 1.

In this case, the maximum excitation current values are 4 amperes at the rotational speed 2000 to 3000 rpm and 3 amperes at the other rotational speed (FIG. 3). Therefore, when a large enough electrical load 4 is connected to the on-vehicle power generator 1 thereby fully generating power, as shown in FIG. 4, 4 amperes of the excitation current is supplied to the field winding 12 at the rotational speed 2000 to 3000 rpm and the on-vehicle power generator 1 generates power, and 3 amperes of the excitation current is supplied to the field winding 12 at the other rotational speed region and the on-vehicle power generator 1 generates power.

Figure 5:
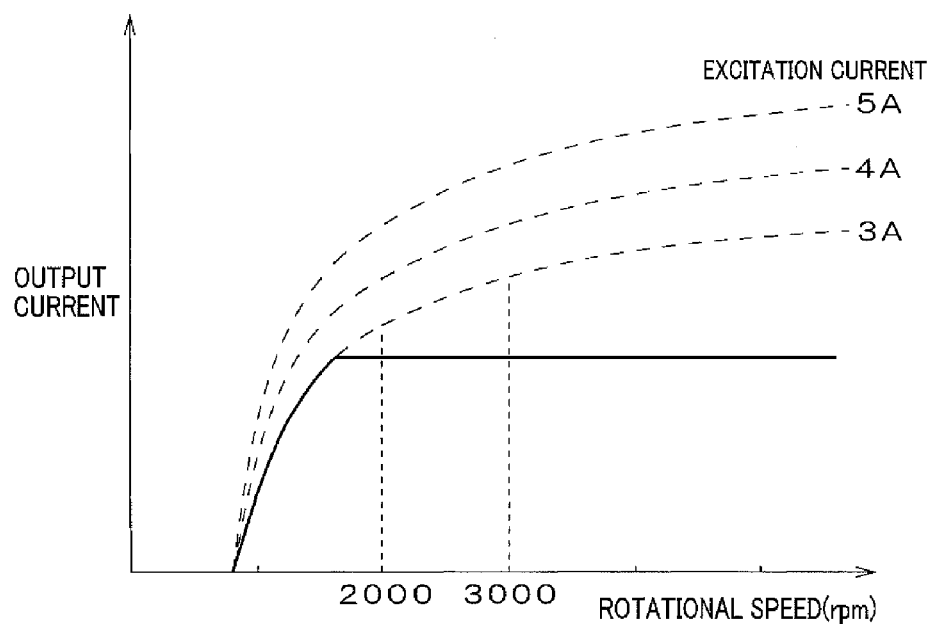
FIG. 5 is a graph showing an output characteristics of the on-vehicle power generator when an amount of the electrical load is small, corresponding to the case 1.

As shown in FIG. 5, when an amount of the electrical load 4 is small (i.e., current flowing through the electrical load 4 is smaller than the output current corresponding to the excitation current 3 ampere), the excitation current is controlled to be less than 3 amperes regardless of the setting value of the maximum excitation current.

Thus, in the above-described case 1, since the excitation current is controlled to be less than or equal to the second upper limit being held in the on-vehicle power generator 1 (in this respect, the same control of the excitation current is applied to the other cases 2 to 4), the upper limit value of the excitation current is not necessary to be changed by the ECU 5 depending on the electrical load 4 that varies based on grade of the vehicle or size of the power generator. Hence, the output power of the on-vehicle power generator can be restricted without preparing a plurality of ECUs having different specs based on grade of respective vehicles. Moreover, since the excitation current can be variably controlled in response to the command transmitted from the ECU 5 while an amount of the excitation current is less than or equal to the second limit value held in the on-vehicle power generator 1, so that the output power of the on-vehicle power generator can be temporarily restricted in response to the running state of the vehicle. Further, even when the power generation control unit 2 is unable to communicate with the ECU 5 when a fault occurs, the excitation current can be controlled to be less than or equal to the second upper limit held in the on-vehicle power generator 1. As a result, the excitation current can be controlled considering a thickness of the charge line depending on types of vehicle and current capacity of the fuse.

(Case 2)

Figure 6:
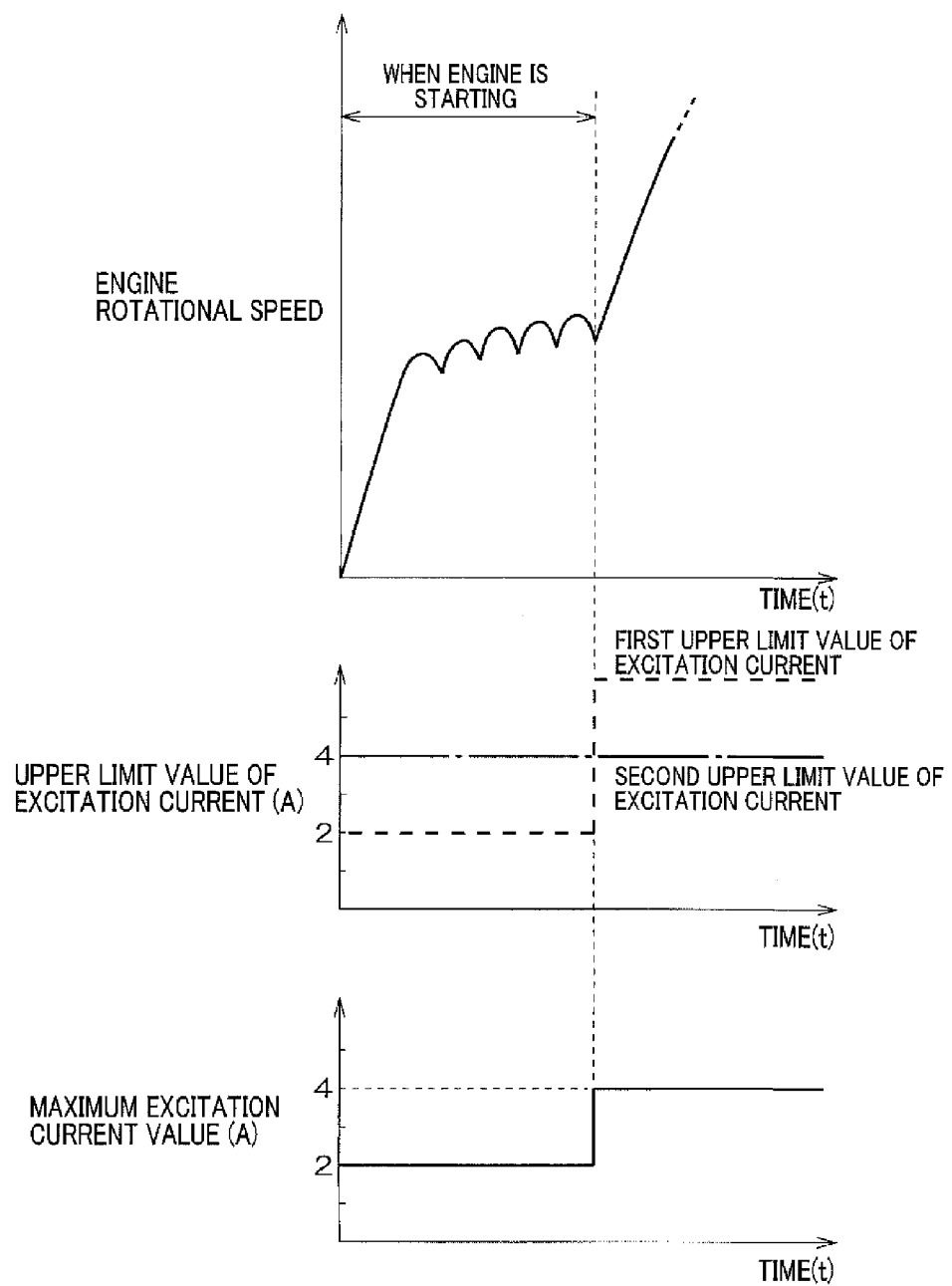
FIG. 6 is a graph showing variations in time including an engine rotational speed before/after the engine-start, the upper limit value of the excitation current, and the maximum excitation current value, corresponding to a case 2.

In the case 2, when the engine starts, the ECU 6 transmits the first upper limit which is smaller than the second upper limit held in the on-vehicle power generator 1. For example, when the second upper limit held in the on-vehicle power generator 1 is set to be 4 amperes, the ECU 5 transmits a command indicating 2 amperes as a first limit value (FIG. 6) when the engine starts. Hence, the maximum value of the excitation current becomes 2 amperes when the engine starts (FIG. 6).

Thus, in the above-described case 2, power generation can be suppressed (restriction of the output power) by reducing the excitation current in response to a command transmitted by the ECU 5 when the engine starts. Therefore, excellent characteristics for starting the engine can be achieved.

(Case 3)

Figure 7:
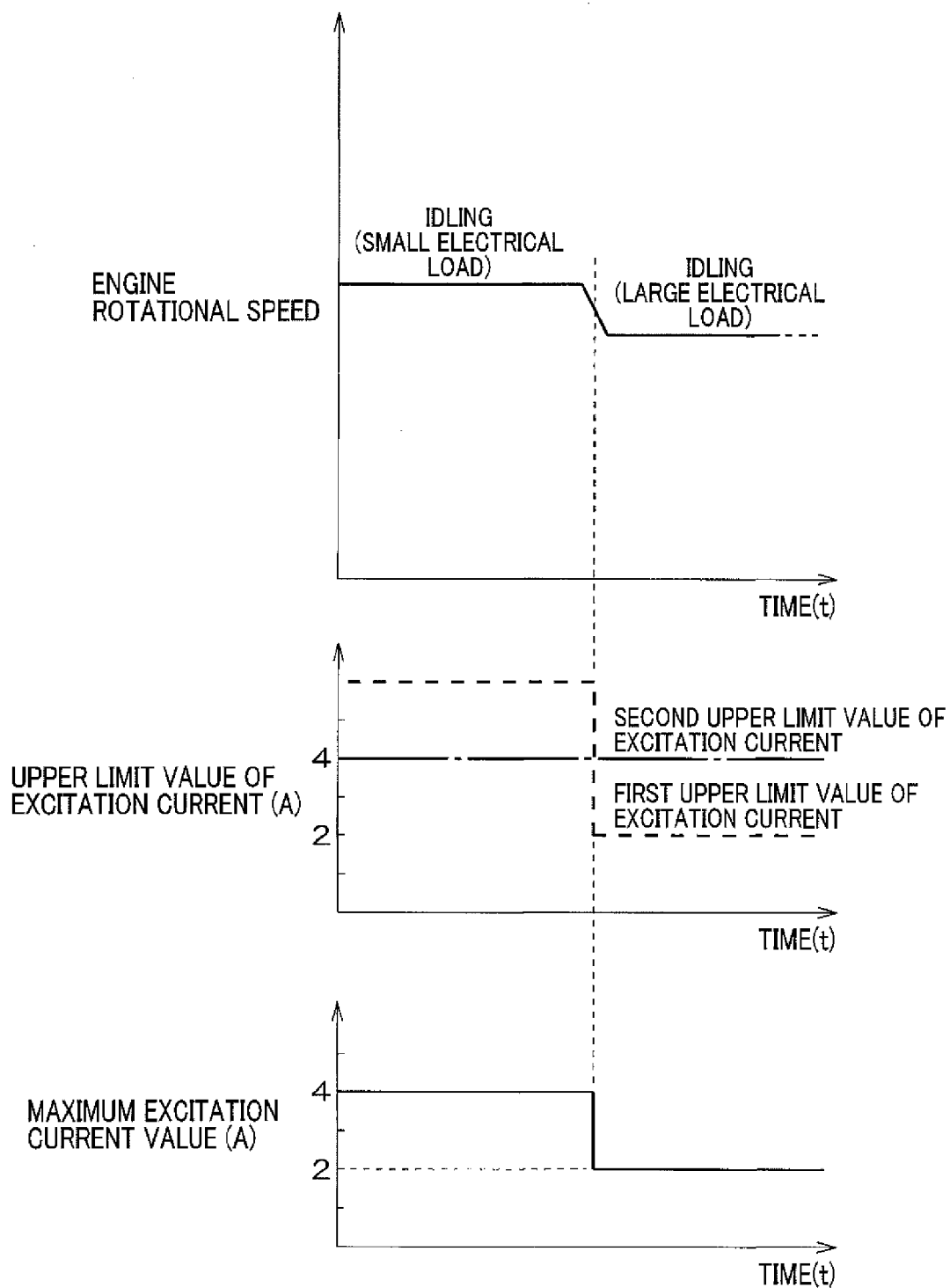
FIG. 7 is a graph showing variations in time including an engine rotational speed when engine is rotating as an idle, the upper limit value of the excitation current, and the maximum excitation current value, corresponding to a case 3.

In the case 3, when the idle rotational speed of the engine decreases (e.g., large electrical load 4 is connected to the on-vehicle power generator 1 when engine rotates with an idle rotation), the ECU 5 transmits a command indicating the first upper limit which is smaller than the second upper limit held in the on-vehicle power generator 1. For example, when the second upper limit held in the on-vehicle power generator is set as 4 amperes, and the idle rotational speed decreases, the ECU 5 transmits a command indicating 2 amperes as a first upper limit (FIG. 7).

Thus, in the above-described case 3, when the torque of the power generator increases due to increasing of an amount of electrical load during the idle rotation, power generation can be suppressed (restriction of the output power) by reducing the excitation current based on the command transmitted from the ECU 5 so that an engine stalling during the idle rotation can be prevented.

(Case 4)

In the case 4, the following conditions are assumed. The second upper limit held in the upper limit value holding circuit 33 includes the first value and the second value which is larger than the first value, i.e., second value>first value (FIG. 8). The first value is used for a case when the rotational speed detected by the rotational speed detecting circuit 37 exceeds a predetermined threshold value and the second value is used for a case when the rotational speed is lower than the predetermined threshold value.

b) The ECU 5 transmits the first upper limit (e.g. 10 amperes representing infinite value) which is larger than the second value as the second upper limit value when the vehicle is decelerating. Therefore, when the vehicle is decelerating, without a command being transmitted from the ECU 5, the excitation current is controlled by using the second upper limit held in the on-vehicle power generator 1 (FIG. 8). The ECU 5 transmits the first upper limit which is smaller than the first value as the second upper limit when the vehicle is not decelerating. Hence, when the vehicle is not decelerating, the excitation current is controlled by using the first upper limit transmitted from the ECU 5 (FIG. 8). As a result, when the rotational speed of the engine is high, the excitation current can be reduced. It is noted that while the vehicle is not decelerating, the ECU 5 may transmit the first upper limit that ranges between the first value and the second value of the second upper limit.

Thus, in the above-described case 4, when the vehicle is not decelerating, the excitation current can be increased within a range not exceeding the upper limit value of the excitation current, whereby an amount of generated power is temporarily increased to perform a regenerative power generation. Moreover, since the second upper limit is set to be smaller value (first value) when the rotational speed is higher than the threshold value, the excitation current can be decreased when the rotational speed is high so that the power generation can be suppressed (restriction of the output power).

The present disclosure is not limited to the above-described embodiments, however, various modification can be made without departing the scope of the present disclosure. According to the above-described embodiments, the rotational speed detecting circuit 37 detects the rotational speed of the on-vehicle power generator 1. Alternatively, the rotational speed of the engine can be detected. In this case, the on-vehicle power generation control unit 1 can be configured to include detecting circuit that detects the rotational speed of the engine, or the rotational speed of the engine can be acquired such that the communication control circuit 32 receives the rotational speed of the engine which is detected by the ECU 5.

What is claimed is:

1. A control unit that controls a power generator mounted on a vehicle, the power generator including a field winding through which an excitation current flows, the excitation current being controlled by the control unit so as to control a power generated by the power generator, the control unit comprising:
   current detecting means for detecting the excitation current that flows through the field winding;
   communication means for communicating with external equipment so as to receive a first upper limit;
   holding means for holding a second upper limit inside the power generator;
   maximum current determining means for determining a maximum current value to be the second upper limit when the first upper limit has not been received by the communication means or when the first upper limit received by the communication means is more than or equal to the second upper limit, and determining the maximum current value to be the first upper limit when the first upper limit received by the communication means is less than the second upper limit; and
   current control means for controlling the excitation current detected by the current detecting means to be within the maximum current value, wherein:
      the control unit further includes a rotational speed detecting means that detects a rotational speed of an engine or the power generator,
      the second upper limit includes a first value which is used when the rotational speed detected by the rotational speed detecting means exceeds a predetermined threshold value and a second value which is used when the rotational speed is lower than the predetermined threshold value, and
      the first upper limit received from the external equipment when the vehicle is decelerating is set to be more than the second value.

2. The control unit according to claim 1, wherein the first upper limit received from the external equipment when the engine of the vehicle starts is set to be less than the second upper limit.

3. The control unit according to claim 1, wherein the first upper limit received from the external equipment when an idle rotational speed of the engine decreases is set to be less than the second upper limit.

4. The control unit according to claim 2, wherein the first upper limit received from the external equipment when an idle rotational speed of the engine decreases is set to be less than the second upper limit.

5. The control unit according to claim 1, wherein the first upper limit received from the external equipment when the vehicle is not decelerating is set to be less than the first value.

* * * * *